United States Patent [19]
Gripshover et al.

[11] Patent Number: 4,491,842
[45] Date of Patent: Jan. 1, 1985

[54] FROZEN WAVE GENERATOR JAMMER

[75] Inventors: Ronald J. Gripshover; Larry F. Rinehart, both of King George, Va.

[73] Assignee: The United States of America as represented by the Secretary of the Navy, Washington, D.C.

[21] Appl. No.: 252,641

[22] Filed: Apr. 9, 1981

[51] Int. Cl.³ .............................................. G01S 7/38
[52] U.S. Cl. ................... 343/18 E; 307/106; 328/67
[58] Field of Search ............... 307/106, 108; 328/59, 328/67; 343/18 E; 455/1

[56] References Cited

U.S. PATENT DOCUMENTS

| | | | |
|---|---|---|---|
| 2,792,508 | 5/1957 | Samsel | 307/106 |
| 3,071,710 | 1/1963 | Fischer | 328/67 X |
| 3,225,223 | 12/1965 | Martin | 307/108 |
| 3,333,203 | 7/1967 | Baker | 328/67 X |
| 3,668,416 | 6/1972 | Marilleau | 307/106 |
| 3,909,828 | 9/1975 | Israel et al. | 343/18 E |
| 4,063,109 | 12/1977 | van der Mark | 307/106 |
| 4,193,032 | 3/1980 | Milberger et al. | 343/18 E |
| 4,280,098 | 7/1981 | Veraldi | 328/59 |

Primary Examiner—T. H. Tubbesing
Attorney, Agent, or Firm—Robert F. Beers; William R. Henderson; John G. Wynn

[57] ABSTRACT

A high peak power, broad band, radio frequency pulse generator generates square wave pulses at a high pulse repetition frequency for use in jamming of radar, data links, voice communication, or other radio frequency signals. The generator is constructed with one or more pairs of coaxial cable formed into opposite half loops. The cable is provided with an inner conductor and outer conductors with the outer conductor of each opposed loop attached to a spark gap switch while the inner conductor is continuous throughout the loops from one side of a matched impedance load, such as an antenna, to the other side of the load. The spark gap switch is provided with a pair of electrodes separated by a gap. The gap contains a dielectric medium having fast spark quenching characteristics and a high standoff voltage. Peak power for the generator is 10 to 100 kilowatts with a pulse repetition frequency of 1 to 100 kilohertz.

9 Claims, 13 Drawing Figures

DISTANCE ALONG CABLE (LOAD AT CENTER)

···· INITIAL FROZEN WAVE

□, ▽, △ TRAVELING WAVES

——— RESULTANT WAVE ON THE CABLE, THE SUM OF THE INITIAL FROZEN WAVE AND THE TRAVELING WAVES

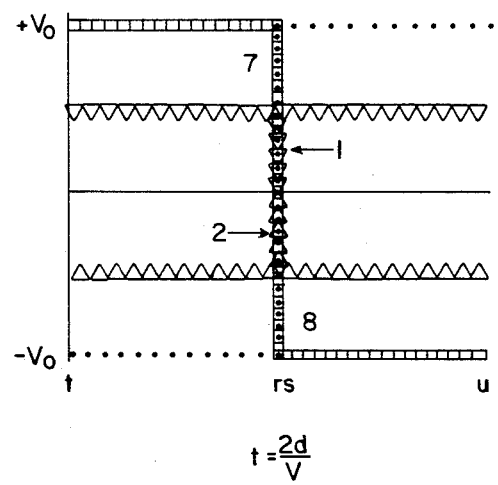
FIG. 11
$t = \frac{2d}{V}$
FIG. 12
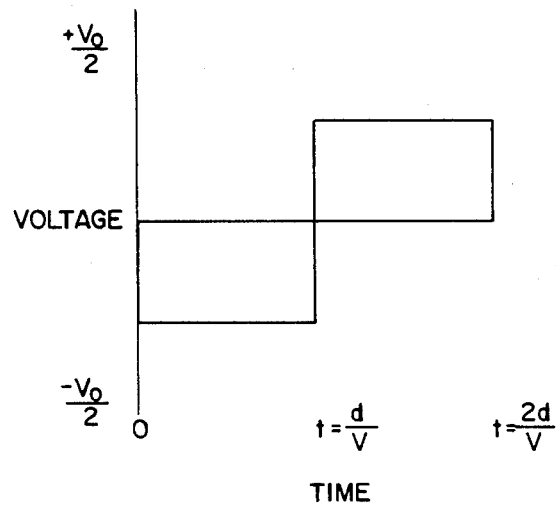
$t = \frac{d}{V}$    $t = \frac{2d}{V}$
TIME
MATCHED IMPEDANCE LOAD
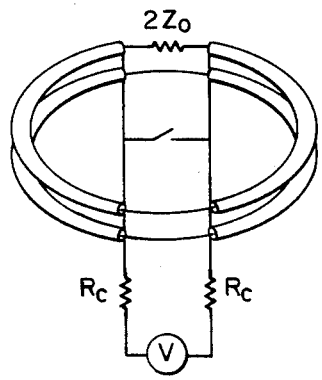
FIG. 13

FROZEN WAVE GENERATOR JAMMER

BACKGROUND OF THE INVENTION

The present invention relates to a frozen wave generator jammer and more particularly to a radio frequency pulse generator for generating pulses having a high peak power and a high pulse repetition frequency.

Prior art radio frequency oscillators have included the pulse generator disclosed in U.S. Pat. No. 2,792,508, to R. W. Samsel. The oscillator of Samsel provides high intensity pules of predetermined character as to frequency of oscillation, intensity and duration without the use of electron discharge devices, transistors, or other translation or other timing devices. The Samsel generator is inefficient and complicated, and it can not generate the high pulse repetition frequenices necessary for its use as a jammer.

The frozen wave generator jammer of the present invention generates radio frequency pulses having a high peak power and a high pulse repetition frequency.

SUMMARY OF THE INVENTION

The present invention is a frozen wave generator for use in the jamming of radar, data links, voice communication, or other radio frequency signals.

The high frequency, square wave pulse generator of the present invention is constructed with one or more pairs of transmission line, such as coaxial cable, for storing pulses of energy. The pairs of coaxial cable are formed into opposite half loops. The coaxial cable is provided with an inner conductor and an outer conductor with the outer conductor of each loop electrically connected to a spark gap switch. The inner conductor of the cable is continuous throughout the loops from one side of the load, through the loops and back to the other side of the load.

The spark gap switch is provided with a pair of opposite electrodes separated by a spark gap. The electrodes are provided with a large diameter to gap ratio to aid in deionization of the spark gap. The switch is positioned in a housing which encloses the electrodes and gap. A dielectric medium such as a gas having a fast spark quenching character and a high voltage standoff is positioned in the gap between the electrodes. The gas may be a composition of 95% argon and 5% hydrogen. Peak power of the generator is 10 to 100 kilowatts with a pulse repetition frequency of 1 to 100 kilohertz.

OBJECTS OF THE INVENTION

Accordingly, it is an object of the present invention to provide a frozen wave generator jammer which produces a square wave pulse.

Another object of the present invention is to provide a radio frequency pulse generator which generates square wave pulses with high peak power.

A further object of the present invention is to provide a frozen wave generator which generates a square wave pulse having high peak power and a high pulse repetition frequency.

A still further object of the present invention is to provide a frozen wave generator for jamming radio frequency signals with high voltage and high pulse repetition frequency.

Yet another object of the present invention is to provide a frozen wave generator jammer that can produce broader frequency spectrums simultaneously than can conventional jammers.

Another object of the present invention is to provide a radio frequency jammer that is of simple and inexpensive construction.

Other objects, advantages, and novel features of the present invention will become apparent from the following detailed description of the invention when considered in conjunction with the drawings.

BRIEF DESCRIPTION OF THE DRAWINGS

A more complete appreciation of the invention and many of the attendant advantages thereof will be readily understood by reference to the following detailed description when considered with the accompanying drawings in which like reference numerals designate like parts throughout the figures and wherein:

FIG. 11 illustrates a graph of potential difference versus distance along the frozen wave generator cable of FIG. 4 at Time=2d/v;

FIG. 12 illustrates a graph of potential with respect to virtual ground versus time at point r of the frozen wave generator of FIG. 4; and FIG. 13 shows a schematic illustration of a two cycle frozen wave generator of the present invention.

DESCRIPTION OF THE PREFERRED EMBODIMENT

Figure 1:
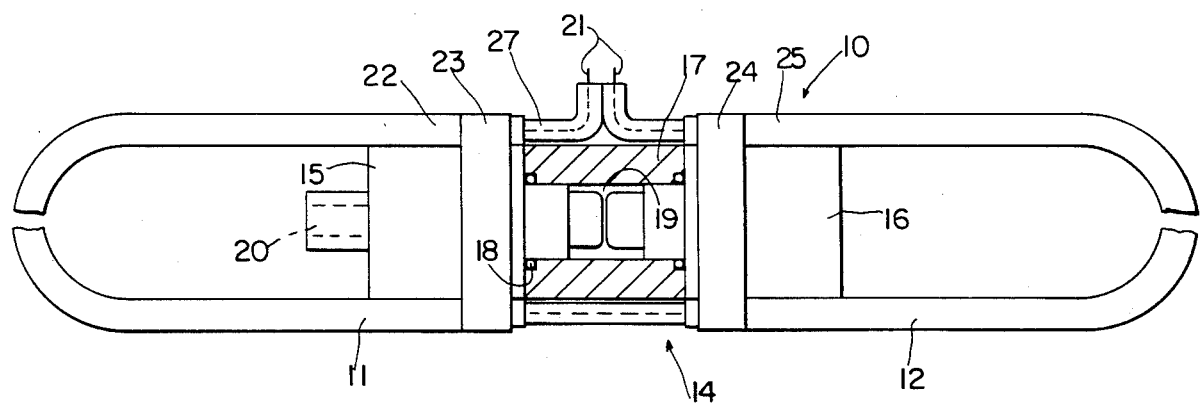
FIG. 1 shows a schematic illustration of the frozen wave generator jammer of the present invention in partial section.

Referring to FIG. 1, there is illustrated a schematic of the frozen wave generator 10 of the present invention. Generator 10 is constructed with one or more pairs of opposed loops of transmission line, such as coaxial cable, illustrated in FIG. 1 as 11 and 12, with each loop of coaxial cable being half of a wavelength in electrical length.

Figure 3:
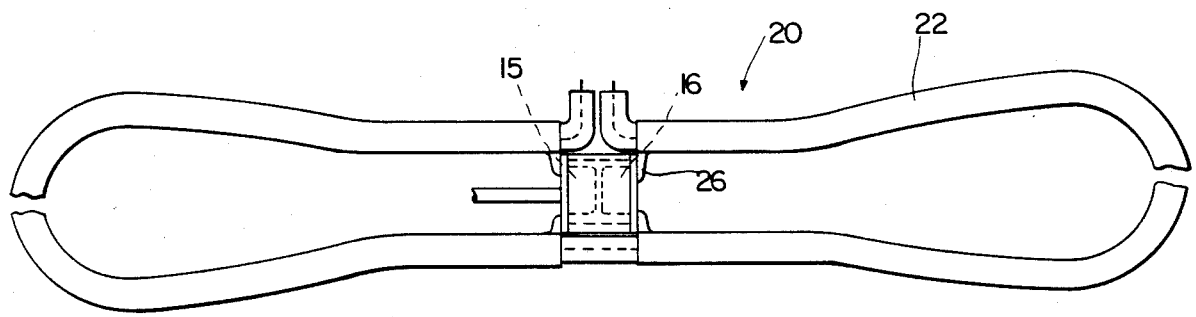
FIG. 3 shows a schematic illustration of an alternative embodiment of the invention of FIG. 1.
Figure 4:
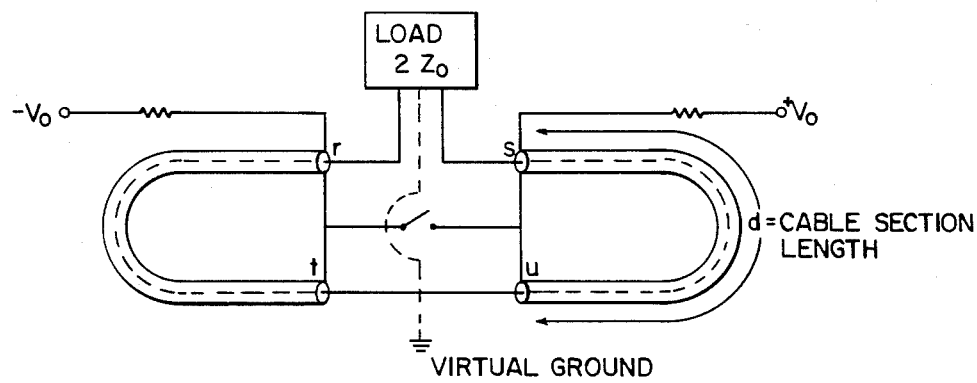
FIG. 4 shows a schematic illustration of a single cycle frozen wave generator.

A spark gap switch 14 is positioned between the opposed loops of the cable. As illustrated in FIG. 1, the coaxial cable is constructed with a continuous inner conductor 21 surrounded by outer conductors 22 and 25. The inner conductor 21 and the outer conductors 22 and 25 are separated by an insulator 27. The inner conductor 21 is continuous throughout the one or more pairs of opposite loops from one side of a matched impedance load to the other side of the load, while the outer conductors 22 and 25 are electrically connected to electrodes 15 and 16, respectively, by means of bands 23 and 24, respectively. Although FIGS. 1, 3 and 4 illustrate the transmission line as being coaxial cable, it is to be understood that balanced line or stripline may also be used for cable loops 11 and 12 in the generator 10.

Figure 2:
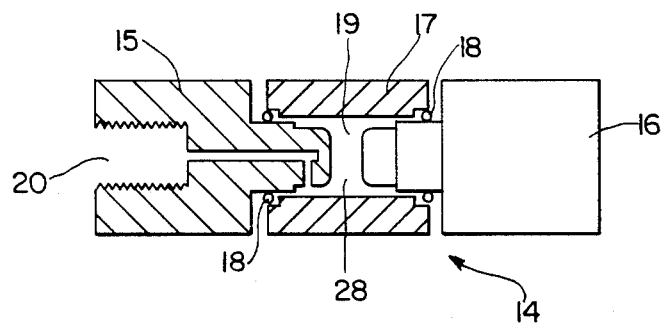
FIG. 2 shows a schematic illustration of the spark gap switch of FIG. 1 in partial section.

As shown in FIG. 1, and better illustrated in FIG. 2, spark gap switch 14 is constructed with the pair of opposite electrodes 15 and 16, separated by a gap 28. The electrodes and spark gap are positioned in housing 17 so as to create a chamber 19 enclosing both the electrodes 15 and 16 and the gap 28. A dielectric medium is positioned in chamber 19 so as to be between electrodes 15 and 16. As shown in FIG. 2, the dielectric medium is furnished to chamber 19 by means of a connection 20 which is positioned in electrode 15.

The dielectric medium may be a gas such as a mixture of 95% argon and 5% hydrogen, which exhibits fast spark quenching characteristics and a high voltage standoff. The dielectric medium acts as a switching mechanism that functions as an insulator until the voltage buildup in the switch reaches a predetermined point causing self-breakdown of the gas. When the gas breaks down, the dielectric medium functions as a conductor until the voltage dropoff reaches another predetermined point at which time the gas recovers and again functions as an insulator. The characteristics of the dielectric medium along with the electrode geometry enable the switch, and thus the generator, to have a high pulse repetition frequency.

Chamber 19 is provided with sealing rings 18 which are positioned circumferentially between the housing 17 and the electrodes 15 and 16 so as to seal the dielectric medium on the chamber 19.

Electrodes 15 and 16 are positioned relative to one another so as to create gap 28 and are constructed with a large electrode diameter to gap ratio which aids in deionization of the gap after firing of the switch.

The pairs of opposite coaxial cable loops 11 and 12 are constructed with each cable loop electrical length equal to half of a wavelength. More of the cable loops may be added as desired to produce a given number of cycles for the generator 10. The additional loops are also half an electrical wavelength and function to statically store square wave pulses in each loop of the cable. A two cycle generator having two pairs of opposite loops is illustrated in FIG. 13. When the spark gap switch fires, a series of traveling waves is initiated which allows the previously frozen energy in the coaxial cable loops to move through the load. The more pairs of cable loops present in the generator, the more cycles generated and the narrower the energy spectrum of the generator's output. The jammer may thus be turned to cover a wide or narrow band of frequencies by adjusting the number of radio frequency cycles in the output.

FIG. 3 illustrates an alternative embodiment for the frozen wave generator 10 illustrated in FIG. 1. As illustrated in FIG. 3, the outer conductor 22 of the coaxial cable loops is attached electrically to the electrodes with solder 26. The inner conductor of the coaxial cable is continuous throughout the loops from one side of the load to the other side of the load. The load may be any type of balanced antenna having two elements.

Figure 5:
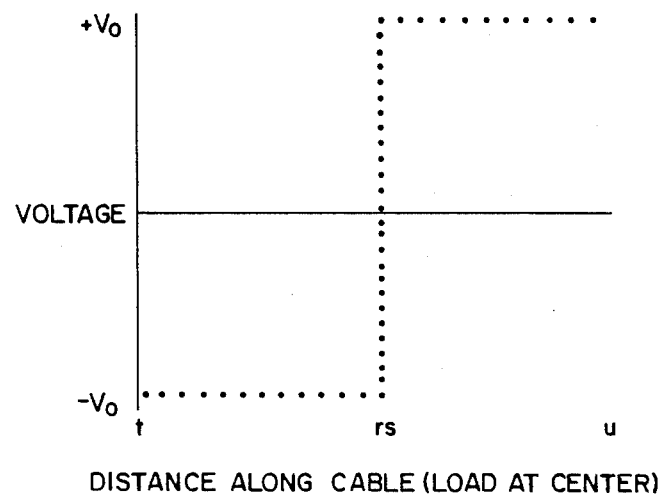
FIG. 5 illustrates a graph of potential difference versus distance along the frozen wave generator cable of FIG. 4 at Time=0.

To clarify the waveforming process in the cable sections of a frozen wave generator, the following is a detailed description of the wave interactions for a single-cycle frozen wave generator as shown in FIG. 4. As shown, the outer conductor of the left-hand cable is charged to a potential difference, $-V_o$, with respect to the inner conductor, and the outer conductor of the right-hand cable is charged to $+V_o$. If we clockwise traverse the cable of the left-hand loop from point "t" to point "r" and jump across the load and continue along the right-hand cable from "s" to "u," a plot of the potential difference between the cable conductors as a function of the distance traveled would appear as illustrated in FIG. 5. Since this distribution remains unchanged until the switch closes, FIG. 5 is a graphical depiction of a wave which is frozen in the device.

Figure 6:
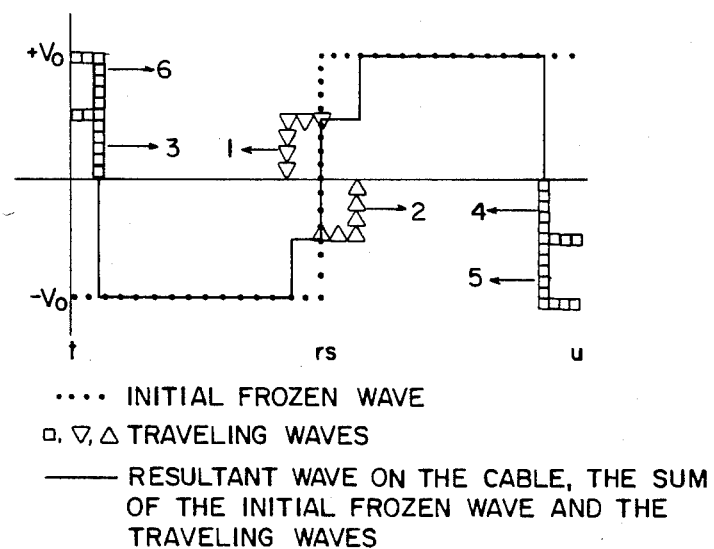
FIG. 6 illustrates a graph of potential difference versus distance along the frozen wave generator cable of FIG. 4 at Time=0+.

When the switch closes, the $+V_o$ and $-V_o$ potentials on the cables cause a virtual ground at the switching point. This causes two waves to be launched at each of the points "r," "s," "t," and "u" (one in each direction). These waves will travel with a velocity, v, in the cables. The distance they travel along the cables is given by $d=v\Delta t$, where $\Delta t$ is the time after switching. The amplitude and position of these waves a short time after switching is shown in FIG. 6. The closed circles represent the initial frozen wave. The $\nabla$, $\Delta$, and $\square$ lines depict the traveling waves. The amplitude of all of the traveling waves is $V_o/2$, since in every case the cable is discharging into an impedance equal to its characteristic impedance (either another cable section or a matched load). The solid line is the resultant wave in the frozen wave generator at the instant of time depicted in the particular figure. The voltage across the load for this instant of time is equal to the voltage discontinuity at the points "r" and "s" in FIG. 4.

At the switching time, t=0, at point "r" a wave (1, FIG. 6) of amplitude $+V_o/2$ will be launched in a counterclockwise direction toward point "t." The other wave from point "r" will be launched clockwise into the load where it will be completely absorbed (since it is a matched load). Likewise, at point "s" a wave (2, FIG. 6) of amplitude $-V_o/2$ will be launched clockwise toward point "u," and a wave will be launched into and absorbed by the load. The two waves launched from "r" and "s" into the load are not shown because they are completely absorbed.

Figure 7:
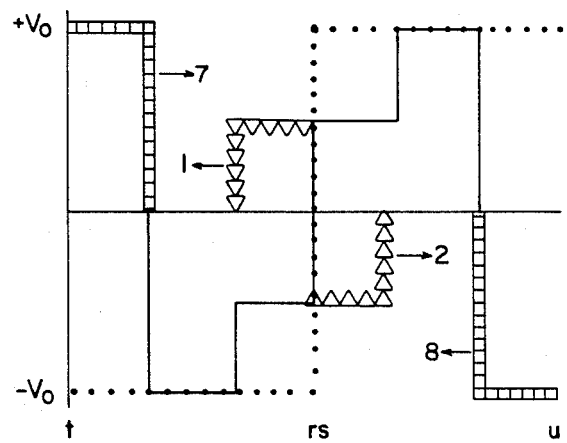
FIG. 7 illustrates a graph of potential difference versus distance along the frozen wave generator cable of FIG. 4 at Time=0+.

At point "t" a $+V_o/2$ wave (3, FIG. 6) will be launched clockwise toward "r." A $-V_o/2$ wave (4, FIG. 6) will also be launched counterclockwise toward "s." Likewise, at "u" a $-V_o/2$ wave (5, FIG. 6) drawn above 4 merely for display purposes, will be launched counterclockwise toward "s" and and a $+V_o/2$ wave (6, FIG. 6) will be launched toward "r." Since the points "t" and "u" are very close together and ideally coincident, the two $+V_o/2$ waves traveling clockwise can be combined into one $V_o$ wave (7, FIG. 7). This is also true for the counterclockwise traveling waves, (8, in FIG. 7). This facilitates keeping track of these waves. FIG. 6 can then be redrawn as in FIG. 7.

Figure 8:
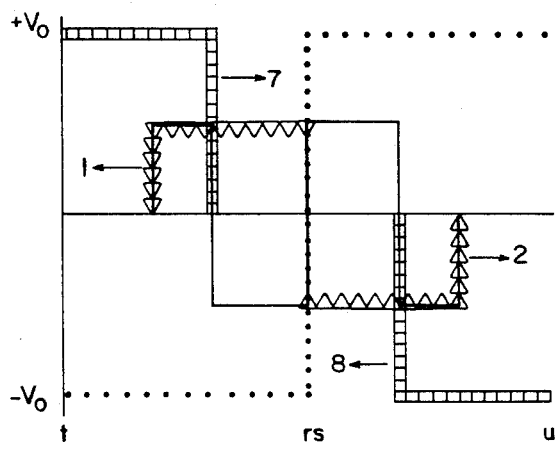
FIG. 8 illustrates a graph of potential difference versus distance along the frozen wave generator gap of FIG. 4 at Time=d+/2v.

FIG. 8 shows the conditions in the frozen wage generator at $t=d+/2v$ shortly after the waves have traveled d/2v along the cable sections. The leading edges of the waves have passed each other.

Figure 9:
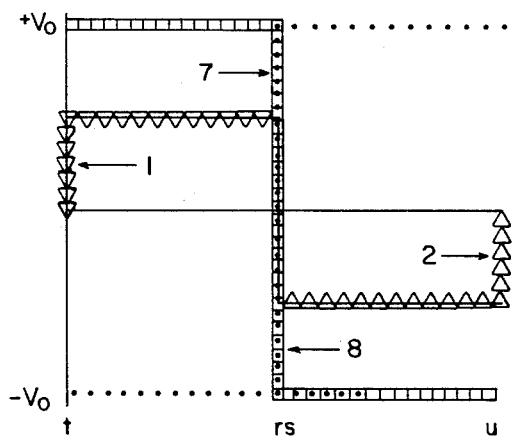
FIG. 9 illustrates a graph of potential differences versus distance along the frozen wave generator cable of FIG. 4 at Time=d/v.

At $t=d/v$ (FIG. 9) waves 7 and 8 are absorbed in the load, which is matched to the impedance of the cable. At this time voltage across the load discontinuously reverses (i.e., the "r" side of the load is now positive rather than negative with respect to the virtual ground).

Figure 10:
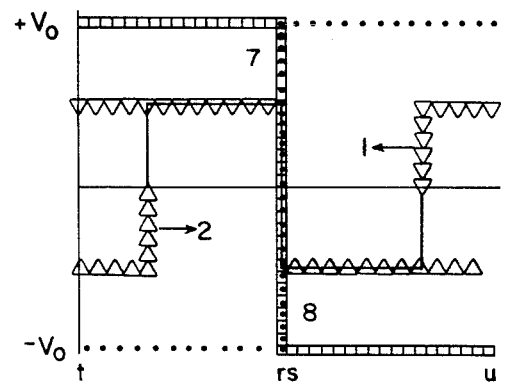
FIG. 10 illustrates a graph of potential difference versus distance along the frozen wave generator cable of FIG. 4 at Time=d+/v.

FIG. 10 illustrates $t=d+/v$. Waves 1 and 2 travel past the t-u switch intersection with no reflection (ideally there is no discontinuity). The resultant wave gives rise to the potential difference across the load as shown.

Finally, in FIG. 11 the traveling waves 1 and 2 are absorbed in the load and the initial frozen wave is completely canceled.

By combining the position-voltage graphs into a time-voltage graph, the time-varying voltage at the "r" side of the load is obtained (FIG. 11). The "s" side has an equal and opposite voltage so that the total voltage across the load is $V_o$ until the time $t=d/v$. The voltage then discontinuously reverses polarity and is again $V_o$ in amplitude. At the time $t=2d/v$ the voltage across the load drops to zero and stays there.

As shown in FIG. 12, the output from the generator is a single square wave cycle. Note that FIG. 12 has the same form as FIG. 5. In FIG. 5 the abscissa is distance, while in FIG. 12 it is time. The output of the frozen wave generator is a time replica of the initial "frozen" wave.

FIG. 13 illustrates a two cycle frozen wave generator with a voltage source V and charging resistors $R_c$ as a means of charging the generator. The charging means illustrated in FIG. 13 is also applicable to the generators illustrated in FIGS. 1, 3 and 4. It is to be understood that the generators illustrated in FIGS. 1, 3 and 4 may be charged through a transformer or inductors without the charging resistors, so as to increase the efficiency of the charging process. The high peak power of the jammer is obtained by Hertz boosting during the charging process. Energy is stored in the generator at a slow rate and low power over a long period of time. The energy is released at high power over a short period of time. Peak power for the generator is 10 to 100 kilowatts with a pulse repetition frequency of 1 to 100 kilohertz.

It is thus apparent that the disclosed radio frequency, square wave pulse generator provides a means for producing high peak power pulses with a high pulse repetition frequency for use in jamming radar, data links, voice communication, or other radio frequency signals. The jammer is simple and inexpensive to construct and can produce broader frequency spectrums simultaneously than can conventional jammers.

Many obvious modifications and embodiments of the specific invention other than those set forth above will readily come to mind to one skilled in the art having the benefit of the teachings presented in the foregoing description and the accompanying drawings of the subject invention, and hence it is to be understood that such modifications are included within the scope of the appended claims.

What is claimed as new and desired to be secured by Letters Patent of the United States is:

1. An improved high frequency square wave pulse generator for generation of pulses of energy in a predetermined frequency range for use in the jamming of radar, data links, voice communications, or other radio frequency signals, said improved high frequency square wave pulse generator being of the type having at least one dipole configured transmission line including inner and outer conductors separated by an insulator and being formed into oppositely disposed first and second half loops so as to form a dipole and configuration for storage of the pulses of energy, wherein the improvement comprises:

a single spark gap switch device operatively connected to said dipole configured transmission line such that said inner conductor thereof is continuous throughout said oppositely disposed first and second half loops from one side of a predetermined load device through said first half loop via said single spark gap switch and through said second half loop via said single spark gap switch to the other side of the predetermined load; such that one half of said outer conductor corresponding to said first half loop farthest from the predetermined load device is electrically connected to a first electrode of said single spark gap switch device and the other half of said outer conductor corresponding to said second half loop farthest from the predetermined load device is electrically connected to a second electrode of said single spark gap switch device; and such that the one half of said outer conductor corresponding to said first half loop nearest to the predetermined load device is connected to a first predetermined voltage potential and the other half of said outer conductor corresponding to said second half loop nearest to the predetermined load device is connected to a second predetermined voltage potential.

2. The improved high frequency square wave pulse generator of claim 1 wherein said single spark gap switch device further comprises, a housing having first and second interfaces operatively affixed to said first and second electrodes, respectively, so as to form a chamber, said first and second electrodes being disposed so as to create a spark gap therebetween, and said chamber being formed so as to enclosed said first and second electrodes and the spark gap created thereby.

3. The improved high frequency square wave pulse generator of claim 2 wherein said first and second electrodes of said single spark gap switch have diameters substantial larger than the spacing of the spark gap therebetween so as to aid in the rapid deionization thereof.

4. The improved high frequency square wave pulse generator of claim 3 wherein said first and second electrodes of said single spark gap switch are configured to have a smooth finish and a predetermined radius so as to suppress arcing to inner walls of said chamber.

5. The improved high frequency square wave pulse generator of claim 4 wherein said single spark gap switch device further comprises, first and second sealing rings disposed circumferentially around said first and second electrodes, respectively, in respective ones of said first and second interfaces of said housing to form a seal therebetween.

6. The improved high frequency square wave pulse generator of claim 5 wherein said single spark gap switch device further comprises, means configured therein for connection to a source of dielectric medium.

7. The improved high frequency square wave pulse generator of claim 6 wherein said means for connection of said single spark gap switch device is configured in said first electrode.

8. The improved high frequency square wave pulse generator of claim 7 wherein said dielectric medium is a gas having a fast spark quenching characteristic and a high voltage standoff.

9. The improved high frequency square wave pulse generator of claim 8 wherein said gas is 95-percent argon and 5-percent hydrogen.

* * * * *